(12) United States Patent
Perets et al.

(10) Patent No.: US 6,381,450 B1
(45) Date of Patent: Apr. 30, 2002

(54) METHOD AND DEVICE FOR MANAGING POWER CONSUMPTION OF A RECEIVER IN STAND-BY MODE

(75) Inventors: Yona Perets, Raanana; Doron Rainish, Ramat-Gan; Shlomo Shamai, Tel-Aviv, all of (IL)

(73) Assignee: D.S.P.C. Technologies Ltd., Petach Tikva (IL)

( * ) Notice: Subject to any disclaimer, the term of this patent is extended or adjusted under 35 U.S.C. 154(b) by 0 days.

(21) Appl. No.: 09/285,274

(22) Filed: Apr. 2, 1999

(51) Int. Cl.$^7$ .................................................. H04B 1/16
(52) U.S. Cl. ....................................... 455/343; 455/574
(58) Field of Search ................................. 455/422, 517, 455/62, 68, 550, 575, 572, 573, 574, 343; 375/224, 225

(56) References Cited

U.S. PATENT DOCUMENTS

| | | |
|---|---|---|
| 4,398,192 A | 8/1983 | Moore et al. |
| 5,031,231 A | 7/1991 | Miyazaki |
| 5,058,203 A | 10/1991 | Inagami |
| 5,140,698 A | 8/1992 | Toko |
| 5,175,874 A | 12/1992 | Auchter |
| 5,224,152 A | 6/1993 | Harte |
| 5,230,003 A | 7/1993 | Dent et al. |
| 5,241,542 A | 8/1993 | Natarajan et al. |
| 5,278,831 A | 1/1994 | Mabey et al. |
| 5,406,613 A | 4/1995 | Peponides et al. |
| 5,566,206 A | 10/1996 | Butler |
| 5,568,513 A | 10/1996 | Croft et al. |
| 5,701,329 A | 12/1997 | Croft et al. |

FOREIGN PATENT DOCUMENTS

FR  0 473 465 A1  5/1991

OTHER PUBLICATIONS

Buda, Fabien, Fang, Juing, Sehier, Philippe, "Soft Decoding of BCH Codes Applied to Multilevel Modulation Codes for Rayleigh Fading Channels". Milcom 1997 vol. 1 pp. 32–36.

Wilson, Stephen G., *Digital Modulation and Coding*, Prentice Hall Inc. new Jersey 1996, pp. 465–489.

Chase, David, "A Class of Algorithms for Decoding Block Codes with Channel Measurement Information". IEEE Transactions on Information Theory, vol. IT–18, No. 1, Jan. 1972. pp. 170–181.

Costillo, Daniel, Lin, Shu, *Error Control Coding*, Prentice–Hall, Inc. Englewood Cliffs, New Jersey, 1983, pp. 58–59, 256–267.

Proakis, John G. . Ph.D., *Digital Communications*, McGraw–Hill Inc. New York, New York 1995. pp. 2–21.

*Primary Examiner*—Thanh Cong Le
(74) *Attorney, Agent, or Firm*—Eitan, Pearl, Latzer & Cohen-Zedek

(57) ABSTRACT le;.5qA device for power management of a receiver includes a soft decoder and a power reducer. The receiver receives repetitions of a word containing a message possibly addressed to the receiver. The soft decoder soft decodes at least one of the repetitions to produce a codeword, and the power reducer reduces power to the receiver when the message contained in the codeword is not addressed to the receiver. The receiver may be a mobile telephone, a wireless local loop, a pager, or a cordless telephone. A method for managing power in a receiver includes the steps of receiving a repetition of a word containing a message possibly addressed to the receiver and combining the repetition with previous repetitions of the word. Candidates are generated from information contained in the combination, and a best candidate is selected from the generated candidates. The probable reliability of the best candidate is determined. If the best candidate is probably reliable and the message contained therein is not addressed to the receiver, power to the receiver is reduced. If the best candidate is probably not reliable, all of the steps are repeated until either the best candidate is probably reliable or no further repetitions of the word are received.

30 Claims, 11 Drawing Sheets

METHOD AND DEVICE FOR MANAGING POWER CONSUMPTION OF A RECEIVER IN STAND-BY MODE

FIELD OF THE INVENTION

The present invention relates to a method for reducing power consumption of analog receivers, in general, and to a method for reducing power consumption of an analog receiver in stand-by mode, in particular.

BACKGROUND OF THE INVENTION

Cellular telephone systems are based upon communications between mobile stations, e.g. cellular telephones, and base stations. Each base station provides coverage for a geographical cell, which typically is between 3 and 24 square kilometers, and has approximately 420 channels (frequencies) available for communication, with a capacity of 40–50 conversations per cell. One of is the channels, known as the forward control channel (FOCC), is used for control communication from the base station to all of the mobile telephones in the cell. Another channel, known as the reverse control channel (RECC), is used for control communication from all of the mobile telephones in the cell to the base station. The remaining channels are used for voice communications.

A base station uses the FOCC to send a continuous wideband data stream to the mobile telephones. Messages transmitted over the FOCC are mobile telephone control messages, broadcast messages, or filler messages. An example of a mobile telephone control message is a beckoning message notifying mobile telephones in the cell that a call has come in for a particular telephone number. Mobile telephones in stand-by mode attempt to detect the beckoning message from the base station. When the mobile telephone being beckoned detects that it is being called, it uses the RECC to notify the base station. The base station then uses the FOCC to notify the mobile telephone which additional channel to use for voice communications, and the mobile telephone switches operation from stand-by to talk mode.

Reference is now made to FIG. 1, which is a schematic illustration of a format of the messages tratted over the FOCC. A message is sent in word blocks, a first word block 10 comprising a preamble 14, five repetitions A1, A2, A3, A4, A5 of a first word A, and five repetitions B1, B2, B3, B4, B5 of a second word B, interleaved with the repetitions of the word A. The base station actually transmits two messages, one composed of A-words and one composed of B-words. A given mobile telephone listens to only one of the messages (A or B), according to its unique identification number. A subsequent word block 16 comprises a preamble 14, five repetitions A1', A2', A3', A4', A5' of a word A', and five repetitions B1', B2', B3', B4', B5' of a word B', interleaved with he repetitions of the word A'.

The preamble 14 comprises a standard, fixed, 10-bit dotting sequence D and a standard, fixed, 11-bit word sync sequence S, used to permit mobile telephones to synchronize with the incoming data.

Reference is now made to FIG. 2, which is a schematic illustration of a bit structure of a word, Each word contains 40 bits, formed by encoding 28 data bits with 12 parity bits according to the BCH (Bose-Chaudhuri-Rocquenghem) encoding technique, which is well known in the art and is a particular example of block coding. The 40-bit words, created by BCH encoding different sets of 28 data bits, differ by at least 5 bits. If no more than two errors are introduced into the 40-bit words, for example due to noise during transmission, then die BCH decoder can correct the errors and still accurately reproduce the 28 data bits. If there are more than two errors, the BCH decoder cannot accurately decode the 40-bit word, In this case, either the BCH decoder fails to decode the 40-bit word claiming too many errors, or a false alarm occurs, in which the BCH decoder gives the wrong 28 data bits and claims that there are no uncorrected errors.

A mobile telephone contains a BCH decoder to decode the 40-bit words received from the base station. Five repetitions of each 40-bit word are sent in order to improve the transfer reliability. A conventional technique for decoding the five repetitions of a word is majority voting, which is well known in the art. For each bit in the word, having a value of say, 0 or 1, it is always possible to choose the value that is repeated the most. The result of the majority voting is then BCH decoded. A lost message occurs when the mobile telephone fails to successfully decode the 40-bit word, even after five repetitions.

A conventional mobile telephone in stand-by mode operates its receiver continuously, receiving messages from the base station and determining whether the messages are addressed to it. It will be appreciated that keeping the receiver on continuously consumes a considerable amount of power, which is of limited supply when the mobile telephone is battery-operated.

There are a number of methods for reducing the power consumption of a receiver in stand-by mode. U.S. Pat. No. 5,140,698 to Toko describes a power saving method in a mobile telephone system. According to Toko, a receiver in stand-by mode that listens only to A-words saves power during those portions of the FOCC message composed of B-words.

U.S. Pat. No. 5,224,152 to Harte describes a different power saving arrangement and method in a portable cellular telephone system. According to Harte, a receiver in stand-by mode decodes each word as it is received. Referring back to FIG. 1, if the BCH decoder successfully decodes A1, and the mobile telephone determines that the A-word is not addressed to it, then the time T1 remaining until the next dotting signal D is calculated, and the power to the receiver is reduced during the time period T1. If the BCH decoder does not successfully decode A1, then the receiver remains at full power. If the BCH decoder successfully decodes A2 when it is received, and the mobile telephone determines that the A-word is not addressed to it, then the time T2 remaining until the next dotting signal D is calculated, and the power to the receiver is reduced during the time period T2.

It will be appreciated that according to Harte, once a repetition of a 40-bit word is not successfully decoded, the information contained therein is not used further to decode subsequent repetitions.

It will also be appreciated by those skilled in the art that when the FOCC is relatively noisy, the device disclosed by Harte will spend relatively little time in the low-power state. More importantly, it will suffer from a higher rate of lost messages than conventional mobile telephones that do majority voting.

U.S. Pat. No. 5,175,874 to Auchter describes a power saving method in which the receiver reduces power as soon as two copies of a word have been successfully decoded and are identical. It will be appreciated that if the FOCC has a low noise level, then a device according to Auchter will remain at full power for longer periods of time than a device according to Harte.

Another method for reducing the power consumption of a receiver in stand-by mode is described in U.S. Pat. No. 5,568,513 to Croft et al. Croft uses soft bits, which are decision variables containing information about the quality of the bits. In conventional analog mobile telephones, the analog signal received by the telephone receiver is filtered, converted to a digital signal, and then filtered by a Manchester demodulator, resulting in soft bits, The soft bits are quantized, and the resulting hard bits (having one of two values, say 0 and 1) are decoded Referring back to FIG. 1, Croft discloses a method whereby the soft bits of A1 are quantized, and then the hard bits of word A1 are BCH decoded. Croft calculates the syndrome of the 40-bit word A1, using a well-known technique similar to that described in Lin, Costello, *Error Control Coding Fundamentals and Applications*, Prentice Hall (1983), pp. 58–60. The syndrome indicates whether the 40 bits are error free, or whether there is a single error, or whether there is more than a single error. In the case of a single error, the syndrome also indicates in which of the 40 bits the error occurs, and Croft corrects the error. Croft refers to the error-free state or the corrected-single-error state as a successful cyclic redundancy check (CRC), and refers to the multiple-errors state as an unsuccessful CRC. If the CRC of A1 is successful, and the word A is not addressed to the mobile telephone, then the power to the receiver is reduced until the next dating and sync sequence is expected If the CRC of A1 indicates that there are uncorrected errors, then the soft bits of A2 are accumulated with the soft bits of A1, the sum is quantized, and the resulting hard bits are BCH decoded. If the CRC of the result is successful, and the word A is not addressed to the mobile telephone, then the power to the receiver is reduced until the new dotting and sync sequence is expected.

Croft teaches a cumulative majority vote in which soft bits are added together. Given a particular signal-to-noise ratio (SNR), a device according to Croft reduces power to the receiver for longer periods of time and has fewer lost messages than a device according to Harte.

U.S. Pat. No. 5,406,613 to Peponides et al. describes yet another power saving method and apparatus for cellular telephones. Like Croft, Peponides teaches adding soft bits together prior to BCH decoding. However, Peponides also uses the VSP (variance of signal power), which is a measure of the noise in the signal, to determine whether to accept a received word. If there is too much noise, the word is rejected. If the noise is acceptable, then the word is soft combined with previous words whose noise is acceptable. Soft bits in the combination whose amplitudes are too small are declared erasures, and if the word has too many erasures, then the next word is received as well. If the number of erasures is acceptable, then the soft combination is quantized and BCH decoded.

BRIEF DESCRIPTION OF THE DRAWINGS

The present invention will be understood and appreciated more fully from the following detailed description taken in conjunction with the appended drawings in which.

DETAILED DESCRIPTION OF THE PRESENT INVENTION

The present invention provides a novel method and device for managing power consumption of a receiver in stand-by mode by soft decoding words received by the receiver. The receiver may be part of a mobile telephone, a wireless local loop, a pager, a cordless telephone or any other wireless apparatus containing a receiver.

Some embodiments of the present invention operate similarly to Croft in that soft bits of word repetitions are combined prior to BCH decoding. However, in accordance with some embodiments of the present invention the soft combination is used, along with pattern templates generated from the decision information contained in the soft bits, to generate test patterns which are then BCH decoded. This is similar to the method described by David Chase in "A Class of Algorithms for Decoding Block Codes with Channel Measurement Information", *IEEE Transactions on Information Theory*, vol. IT-18, No. 1, January 1972 for block codes in general. The candidate codeword which is most similar to the soft combination, called the best candidate, is selected, and then the reliability of the best candidate is determined as a function of its similarity to its corresponding test pattern and of all the candidate codeword.

Figure 1:
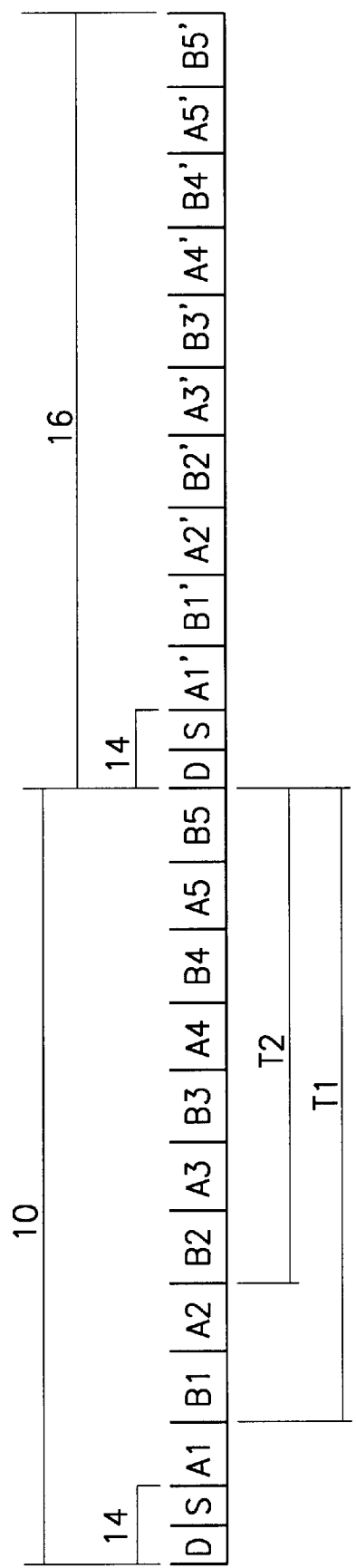
FIG. 1 is a schematic illustration of a format of the messages transmitted over the FOCC.
Figure 2:
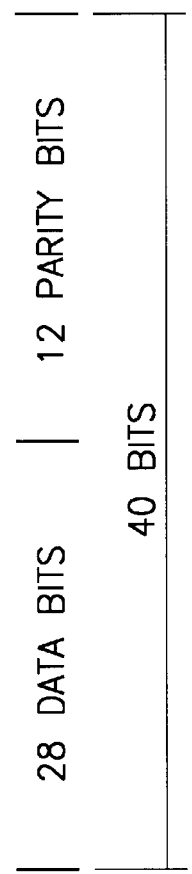
FIG. 2 is a schematic illustration of a bit structure of a word.
Figure 3:
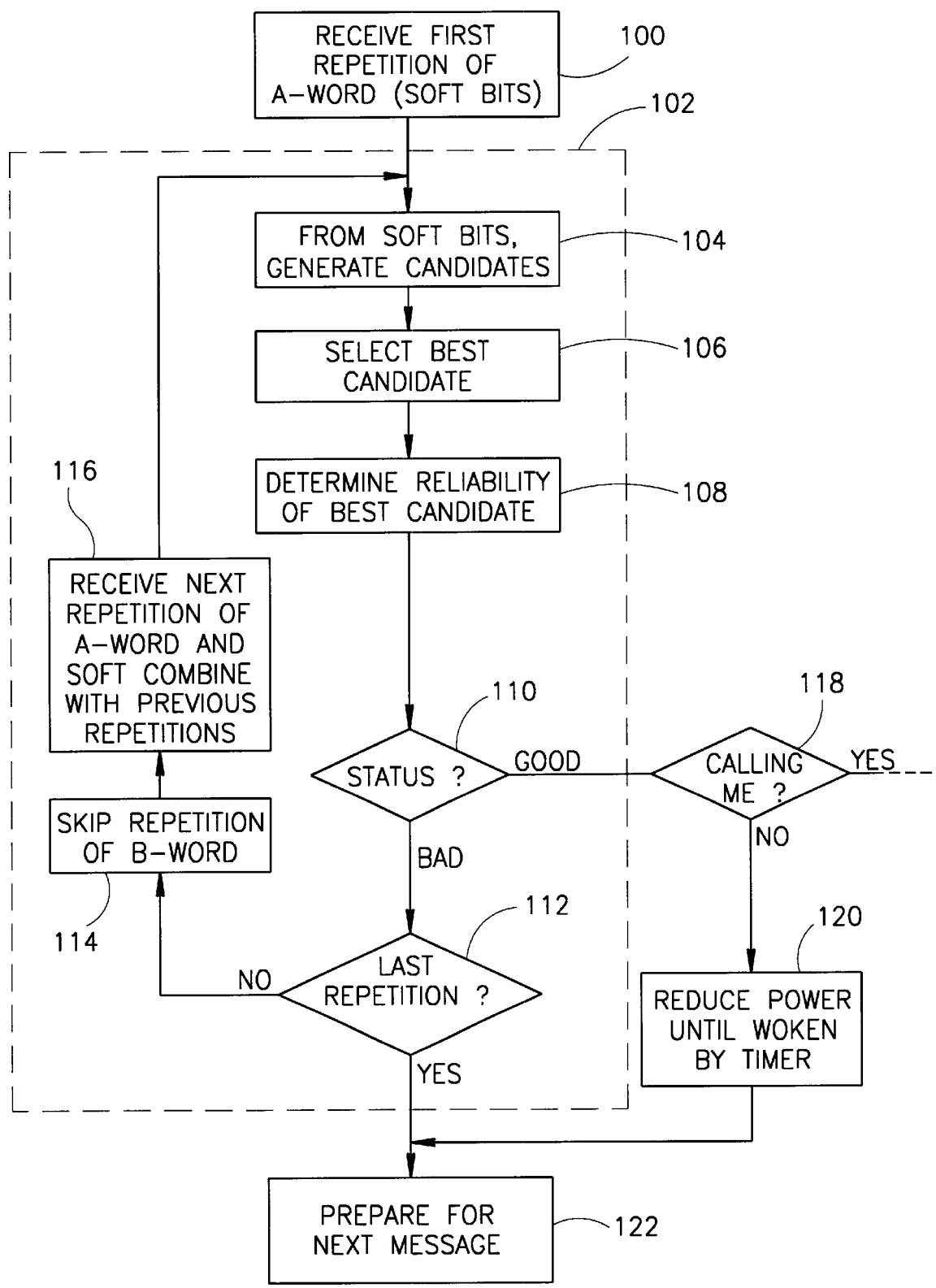
FIG. 3 is a schematic flowchart illumination of the general method of some embodiments of the present invention.

Specifically, FIG. 3 schematically illustrates the general method of some embodiments of the present invention The receiver receives (step 100) the first repetition of a word. Then a loop 102 begins, in which candidates are generated from the soft bits of the word (step 104), the best candidate is selected (step 106), the reliability of the best candidate is determined (step 108), and the word status is checked (step 110). If the word status is bad and there are more repetitions (step 112), the repetition of the B-word is skipped (step 114), and the next repetition of the A-word is received and soft combined (step 116) with he previous repetitions. This soft combination could be weighted with factors related to the received signal strength indicator (RSSI), which is additional information about groups of bits available in the receiver. Loop 102 then resumes with the generating (step 104) of candidates from the soft combination. The steps of generating candidates (step 104), selecting a best candidate (step 106), and determining the reliability of the best candidate (step 108), will be explained in greater detail below with reference to FIG. 4. If the word status is good, the receiver checks (step 118) whether the beckoning message is addressed to it. If so, then talk-mode methods are invoked, as indicated by the ellipsis. If the beckoning message is not addressed to the receiver, the power is reduced (step 120) until a timer causes the power to be restored, at which time the receiver prepares (step 122) for the next message. If the word status is bad and there are no more repetitions of the word, then the message is lost, and the receiver prepares (step 122) for the next message.

The timer of step 120, once synchronized with the dotting and sync preamble of the FOCC (forward control channel) message, is set to wake up the receiver after a predetermined time his predetermined time corresponds to the fixed length of messages transmitted over the FOCC. In the event that the receiver is powered down during reception of a message, the power is filly restored when the timer reaches the predetermined time, regardless of at what time, the power was reduced. According to some embodiments of the present invention, there is no calculation of the time period beginning when the power is reduced and ending when the next message begins.

Figure 4:
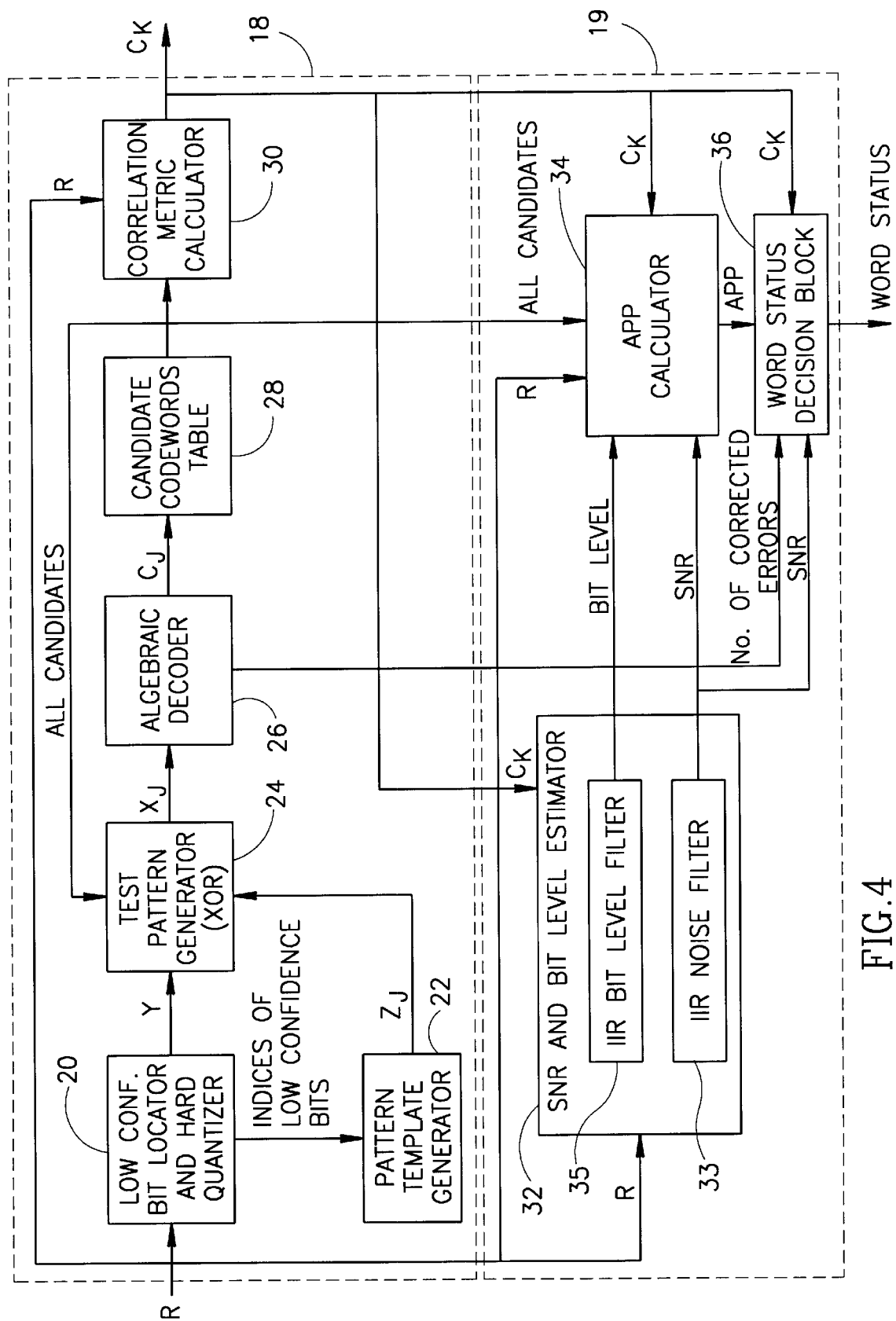
FIG. 4 is a schematic block diagram of the soft BCH decoder which performs some of the steps of FIG. 3, according to some embodiments of the present invention.

Reference is now made to FIG. 4, which is a schematic block diagram of the device which performs the steps 104–108 of the method shown in FIG. 3, according to some embodiments of the present invention. The device comprises a soft decoder 18 and a word reliability unit 19. The soft BCH decoder 18 comprises a low confidence bit locator and hard quantifier 20, a pattern template generator 22, a test pattern generator 24, an algebraic decoder 26, a candidate codeword table 28, and a correlation metric calculator 30. The word reliability unit 19 comprises a bit level and SNR estimator 32, an APP (a posteriori probability) calculator 34 and a word status decision block 36. The bit level and SNR estimator 32 comprises an infinite impulse response (IIR) noise filter 33 and an IIR bit level filter 35.

In operation, an input signal R, received as soft bits, is either the first repetition of a word in an FOCC message, or a soft combination of more than one repetition of the word, The low confidence bit locator and hard quantizer 20 converts the soft bits of the input signal R, into hard bits of a 40-bit word Y. The low confidence bit locator and hard quantizer 20 also locates indices of bits of the entire 40-bit word Y having low confidence, without reference to which are data and which are parity bits. In some embodiments of the present invention, t soft bits having low amplitude are identified as having low confidence. In other embodiments of the present invention, the RSSI is used, alone or in conjunction with the amplitude information, to identify low confidence bits, The pattern template generator 22 creates $2^t$ pattern templates, the templates having zeros at the indices of high confidence bits, and every possible combination of zeros and ones at the indices of low confidence bits. For example, if bit 3 and bit 24 of the 40-bit word Y are found to have the lowest confidence (t=2), four pattern templates are created.

The test pattern generator 24 adds (modulo-2) the pattern template $Z_0$ to the word Y, thereby creating a new 40-bit word $X_0$, a test pattern. The test pattern $X_0$ is fed into the algebraic decoder 26. The algebraic decoder 26 corrects up to and including two errors in the word $X_0$. If there are more than two errors, the test pattern is rejected. If the algebraic decoder 26 succeeds in producing a candidate codeword $C_0$, then the candidate codeword $C_0$ is added to the candidate codeword table 28. The algebraic decoder 26 corrects up to two errors in the test pattern, using the method described in *Error Control Coding Fundamentals and Applications*, pp. 257–267.

The test pattern generator 24 adds (modulo-2) the next pattern template $Z_1$, to the word Y, thereby creating a new 40-bit word $X_1$, a test pattern. If the test pattern $X_1$ differs by less than three bits from the first candidate codeword $C_0$ in the candidate codeword table 28, then it is not used, as it will produce the same candidate codeword $C_0$ after decoding. If $X_1$ differs by more than two bits from any of the candidate codewords in the candidate codewords table 28, then it is fed into the algebraic decoder 26. If the algebraic decoder 26 succeeds in producing a candidate codeword, it is added to the candidate codewords table 28 as candidate codeword $C_1$. This procedure is repeated for each pattern template. It will be appreciated that the candidate codewords $C_j$ in the candidate codewords table 28 are distinct.

The correlation metric calculator 30 selects the best candidate from the candidate codewords table 28. The saturated Euclidean Metric, which roughly measures how close $C_j$ is to the input signal R, is given by Equation 1:

$$\text{Metric}_j = \frac{1}{40 \cdot AverageBitLevel^2} \sum_{i=1}^{40} (R_i - AverageBitLevel \cdot C_{ij})^2 \quad (1)$$

where AverageBitLevel is the estimated level of the incoming soft bits, produced by the bit level and SNR estimator 32, as described hereinbelow with respect to Equations 7 and 8, $R_i$ are the soft bits of the input signal R, $C_{ij}$ are the bits of the candidate $C_j$, j=0, . . . , $j_{max}$–1, and $j_{max}$ is the total number of candidates. The best candidate is the candidate $C_k$ that minimizes the metric.

The metric is called "saturated" because the amplitude of the input signal R has been limited by a soft limiter in the receiver before Manchester demodulation. The receiver contains an analog to digital converter whose output is a quantized instantaneous frequency. The soft limiter limits this frequency to be within the range defined by ±1.25 times the standard peak deviation, by replacing input signals outside the range with the limiting value. The standard peak deviation is defined in the Advanced Mobile Phone Service (AMPS) standard as 8 kHz, and in the Japanese Total Access Communication System (JTACS) standard as 6.4 kHz.

It will be appreciated by those skilled in the art that the candidate $C_k$ which minimizes the metric of Equation 1 also maximizes the correlation metric given by Equation 2:

$$CorrelationMetric_j = \sum_{i=1, C_{ij} \neq C_{j0}}^{40} R_i \cdot C_{ij} \quad (2)$$

The correlation metric calculator 30 calculates the correlation metric from only those bits which differ from the bits of candidate codeword $C_0$, and does not require any knowledge of the average bit level. For example, if the candidate codeword $C_0$ is $C_0$=0011001001011100011100101011110001010101 and the candidate codeword $C_j$ is $C_j$=1100001001011100011100101011110001010101, then $C_j$ differs from $C_0$ only in the first four bits of the 40-bit word, and the correlation metric for the candidate codeword $C_j$ then has the value $R_1 C_{1j} + R_2 C_{2j} + R_3 C_{3j} + R_4 C_{4j}$.

Once the correlation metric calculator 30 has selected the best candidate $C_k$, it must be determined whether the best candidate $C_k$ is reliable or not. There are a number of methods for determining reliability of a received word. According to some embodies of the present invention, the APP calculator 34 calculates the APP of the best candidate $C_k$, in a method similar to that described in Proakis, *Digital Communications*. 3$^{rd}$ edition, McGraw-Hill (1995), p. 21. If the APP of the best candidate $C_k$ is less than a given threshold, and the best candidate $C_k$ is not identical to the corresponding test pattern $X_k$, the word status is the to be bad, and the next repetition of the word will be received and soft combined with previous repetitions.

The APP gives the probability of the selected code, $P(C_k/R)$, which is the probability that candidate $C_k$ is transmitted by the base station when the input, signal is R. A formula for the APP is given in Equation 3:

$$APP = P(C_k/R) \cong \frac{1}{1 + \sum_{j \in A, j \neq k} \prod_{i \in B} \alpha_i \left( \frac{C_{ij} - C_{ik}}{2} \right)}, \quad (3)$$

where k is the index of the best candidate in the candidates table 28, A is the set of all candidates in the candidates table 28, B is the set of all bits that are not identical in all candidates, and $C_{ij}$ are the bits of candidate $C_j$. It will be appreciated that the APP for the best candidate is calculated from all of the candidates.

The coefficient $\alpha_i$ in Equation 3 is defined as $\alpha_i$=exp(-2·SNR·$R_i$/AverageBitLevel), where SNR is the signal-to-noise ratio of the input signal, and $R_i$ are the soft bits of the input signal. The bit level and SNR estimator 32 estimates the SNR, which is the ratio of signal power to noise power, as given in Equation 4:

$$SNR = \frac{AverageBitLevel^2}{AverageNoiseVariance}, \quad (4)$$

where AverageNoiseVariance and AverageBitLevel are determined as follows.

Initially, the noise variance EstimatedNoiseVariance is estimated using the formula given in Equation 5:

$$EstimatedNoiseVariance = \max \left\{ \begin{array}{l} \frac{1}{40} \sum_{i=1}^{40} R_i^2 - AverageBitLevel^2, \\ \frac{NominalBitLevel^2}{100} \end{array} \right\}, \quad (5)$$

where the nominal bit level NominalBitLevel is the bit level of a noiseless signal, which is the standard peak deviation mentioned hereinabove, multiplied by the number of samples per bit.

The estimated noise variance is passed through the IIR noise filter 33 to reduce the variance, and produce the average noise variance AverageNoiseVariance, as given in Equation 6:

AverageNoiseVariance=AverageNoiseVariance·(1−AverageStep),
+EstimatedNoiseVariance·AverageStep (6)

where AverageStep is the forgetting factor of the IIR noise filter 33. The forgetting factor is a measure of how much the peaks and valleys of the input are smoothed out by the IIR noise filter 33.

The bit level and SNR estimator 32 estimates the average bit level AverageBiztevel from the estimated bit level. The estimated bit level EstimatedBitLevel is related to the coixelation between the best candidate and the incoming soft bits, as given in Equation 7:

$$EstimatedBitLevel = \frac{1}{40} \sum_{i=1}^{40} R_i \cdot C_{ik}, \quad (3)$$

where $C_{ik}$ are the bits of the best candidate $C_k$. The IIR bit level filter 35 reduces the variance of the estimated bit level, and produces the average bit level AverageBitLevel as follows in Equation 8:

AverageBitLevel=AverageBitLevel·(1−AverageStep),
+EstimatedBitLevel·AverageStep (4)

where AverageStep is the forgetting factor of the IIR bit level filter 35. When the receiver is first powered on, the calculation of the average bit level AverageBitLevel given in Equation 8 could lead to a negative or zero average bit level, which would in turn lead to a physically impossible value for the coefficient $\alpha$, used in Equation 3. Therefore, if the average bit level AverageBitLevel calculated from Equation 8 falls below a minimum bit level MinimumBitLevel, then the minimum bit level MinimumBitLevel is used instead of the average bit level AverageBitLevel in the calculation of the coefficient $\alpha_i$. According to some embodiments of the present invention, the minimum bit level MinimumBitLevel is set to 0.2 times the nominal bit level NominalBitLevel described hereinabove with respect to Equation 5.

As mentioned hereinabove, the word status decision block 36 compares the result of the APP calculation (Equation 3) to a threshold. If the APP of the best candidate $C_k$ is less than the threshold, which is given in Equation 9:

$$Threshold = \frac{1}{1 + \exp(-2.5 - SNR)}, \quad (9)$$

and the output of the algebraic decoder 26 indicates that errors were corrected when decoding $X_k$ to $C_k$, then the word status of the best candidate $C_k$ is considered bad, and the next repetition of the word will be received and soft combined with previous repetitions.

Simulations of the receiver of an embodiment of the present invention were conducted, and the results compared wit a receiver according to Croft. Constant parameter values for the simulation are given in Table 1:

| Parameter Name | Value |
| --- | --- |
| AverageStep (forgetting factor of IIR filter) | 0.01 |
| t (number of low confidence bits) | 6 |
| $j_{max}$ (number of candidates) | 8 |

Simulations were conducted both for static channel (Additive White Gaussian Noise (AWGN)) conditions and for Rayleigh fading channel conditions with a vehicle speed of 32 kilometers per hour.

Figure 5:
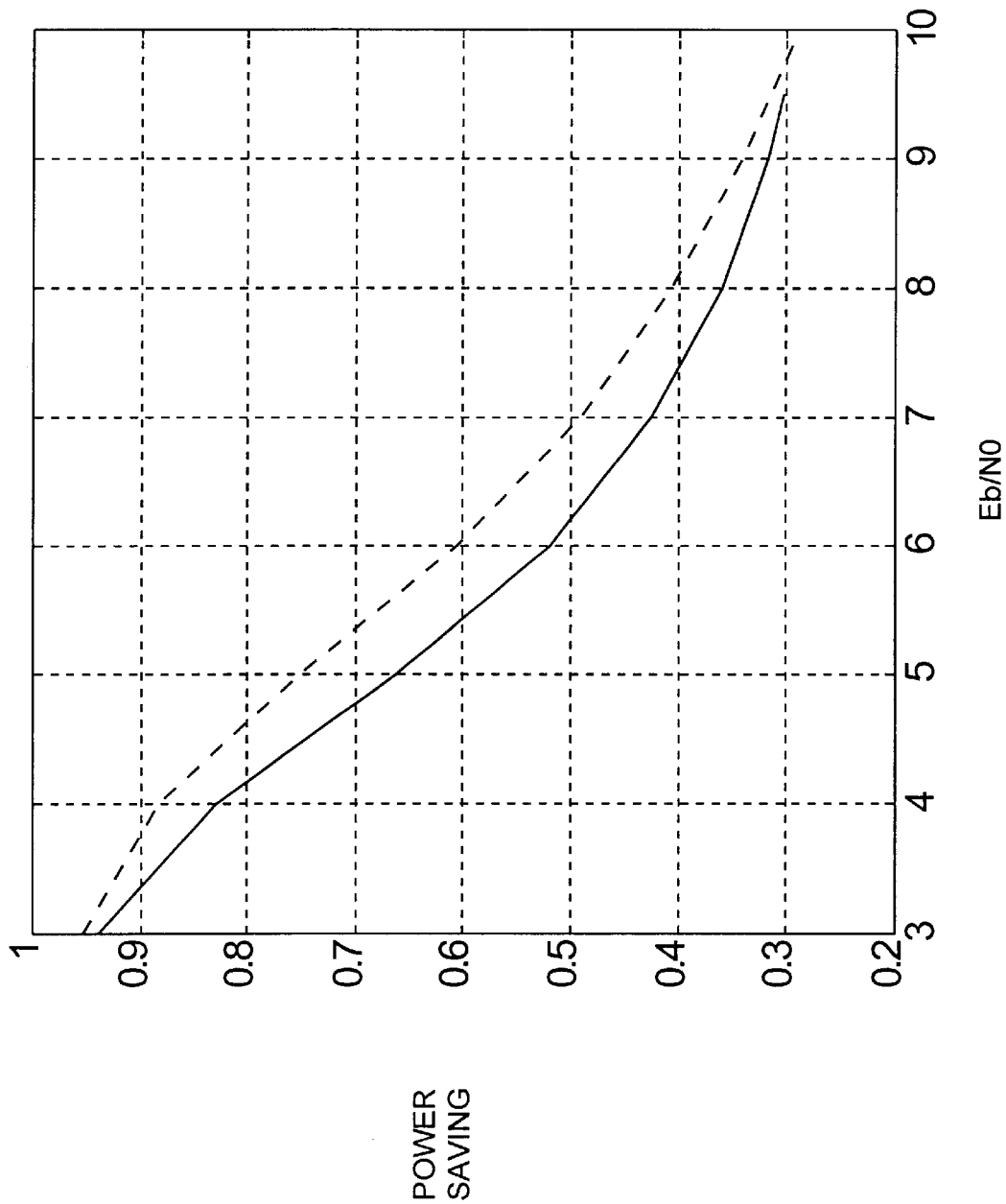
FIG. 5 is a graph comparing the power saving on a static channel of a receiver of an embodiment of the present invention, and that of a receiver according to Croft.
Figure 6:
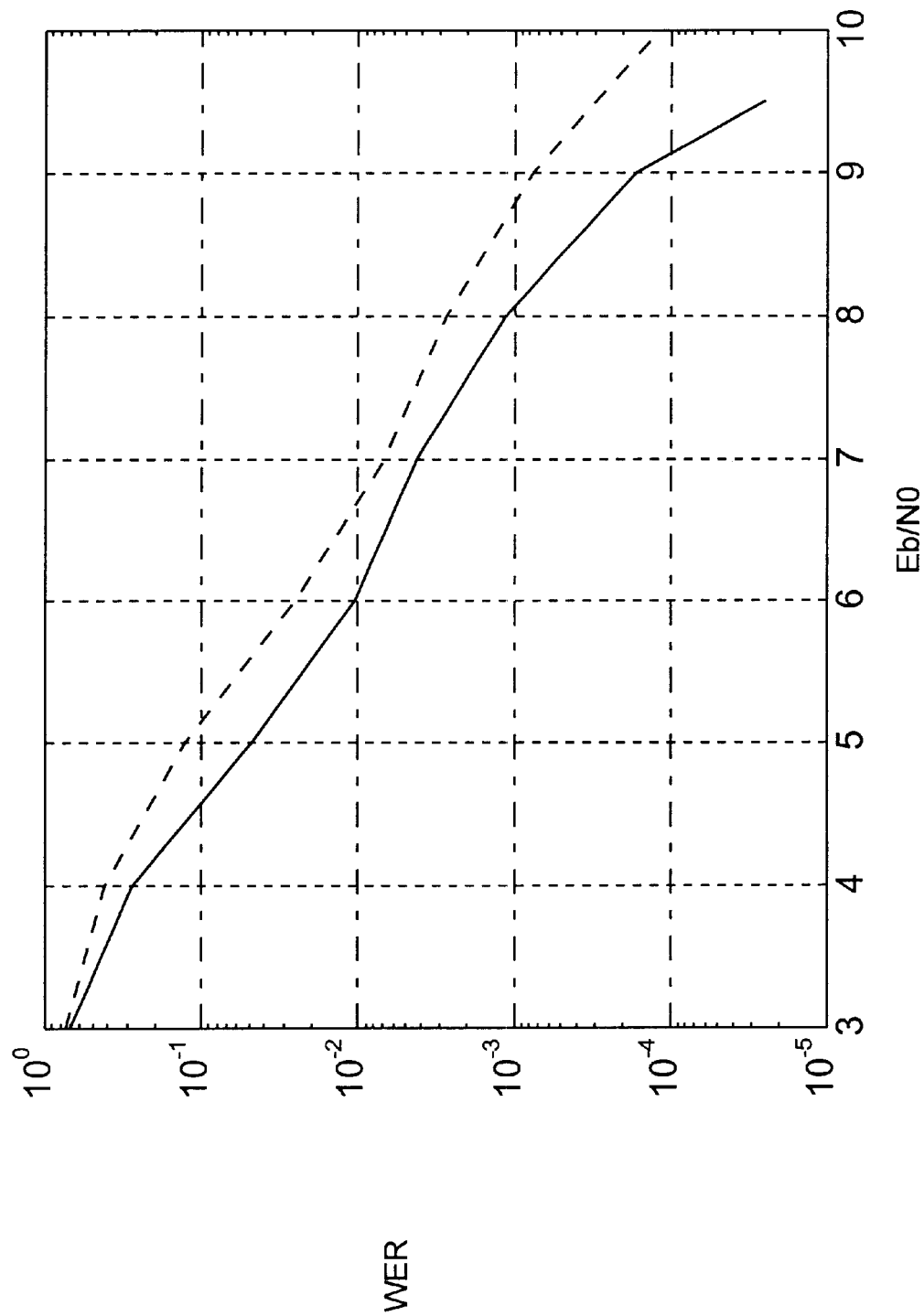
FIG. 6 is a graph comparing the word error rate (WER) on a static channel of a receiver of an embodiment of the present invention, and sat of a receiver according to Croft.
Figure 7:
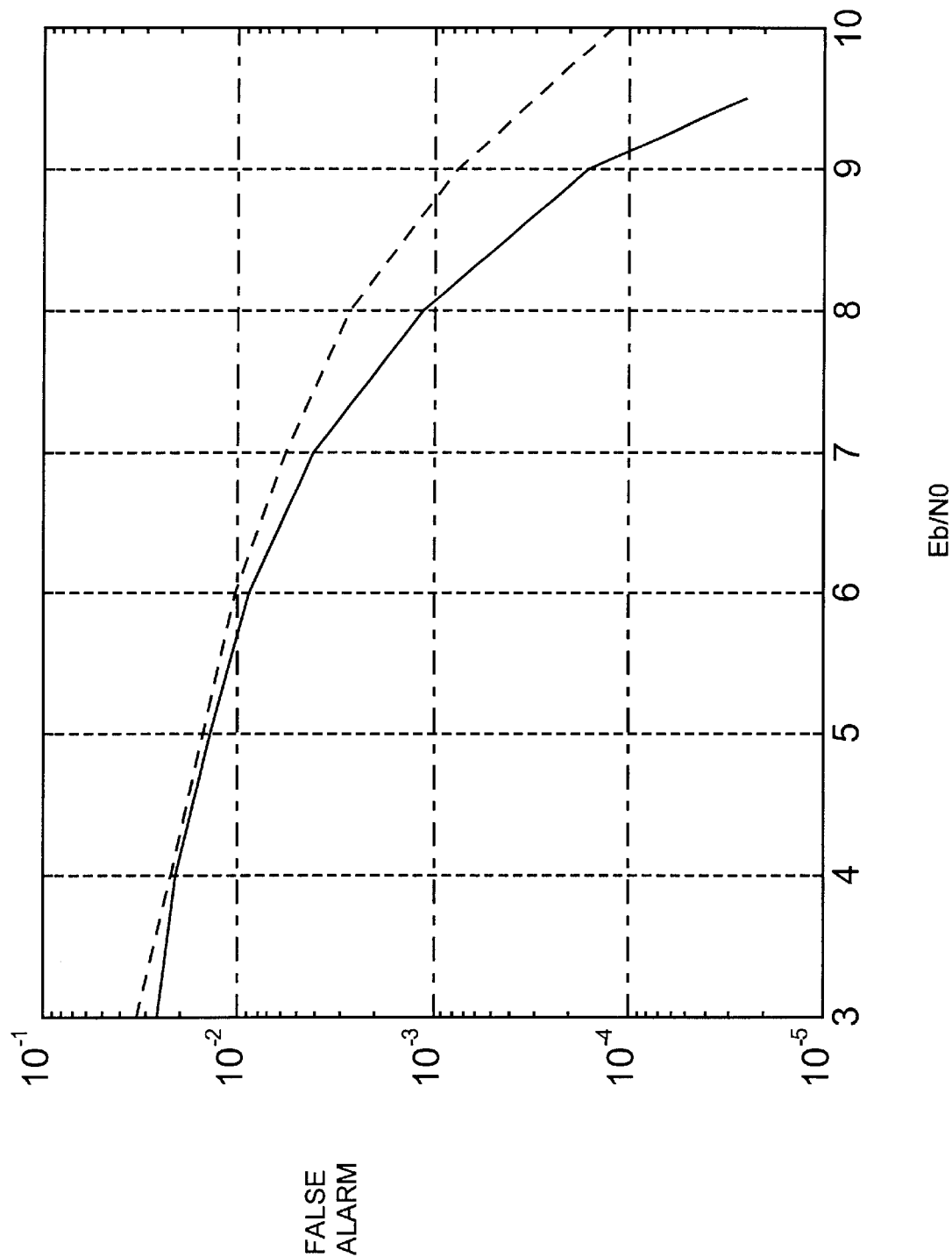
FIG. 7 is a graph comparing the false alarm rate on a static channel of a receiver of an embodiment of the present invention, and that of a receiver according to Croft.
Figure 8:
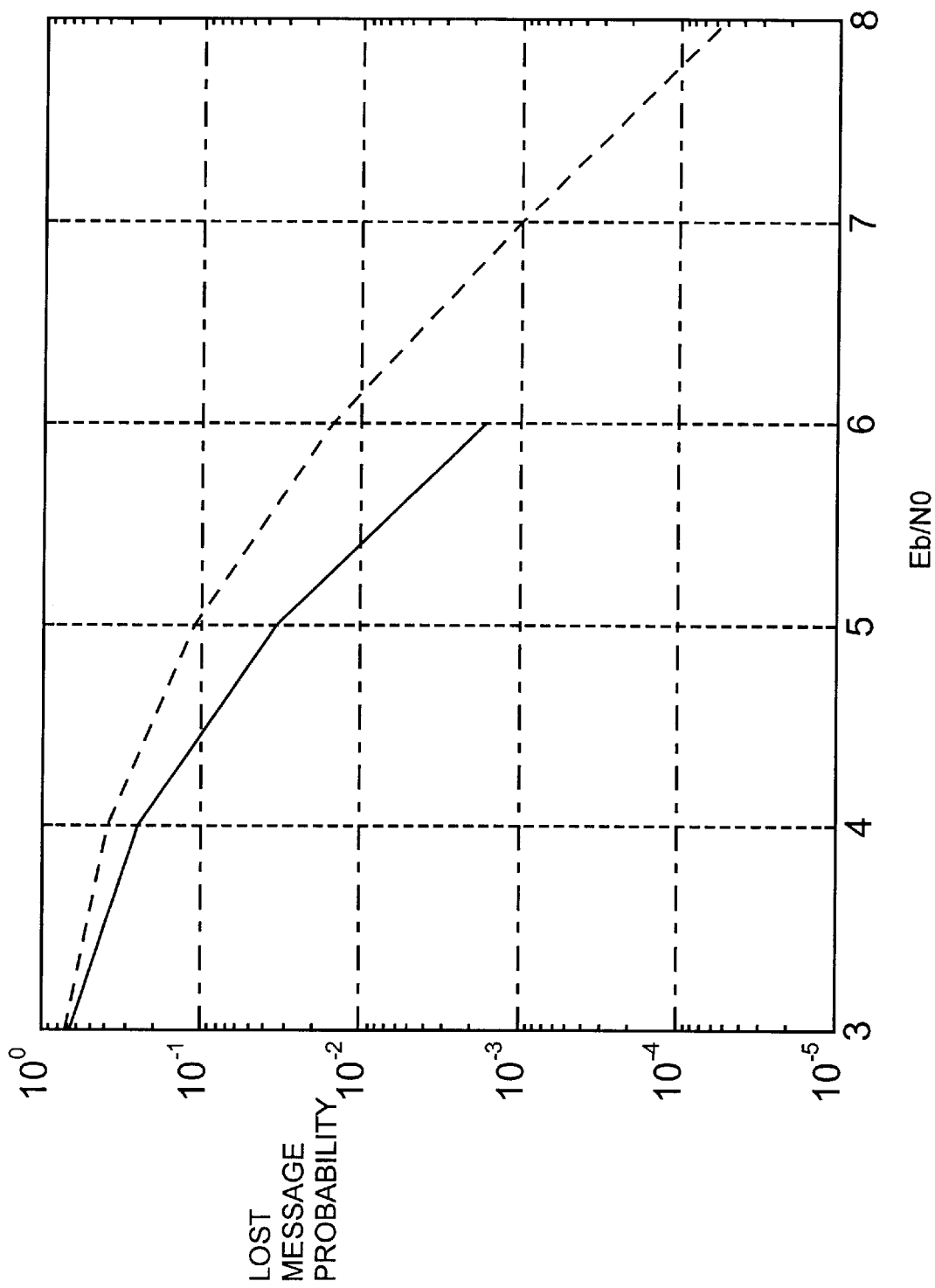
FIG. 8 is a graph comparing the probability of a lost message on a static channel of a receiver of an embodiment of the present invention, and that of a receiver according to Croft.

The results of the static channel simulation, comparing a receiver according to an embodiment of the present invention to a receiver according to Croft, are shown in FIGS. 5, 6, 7 and 8, to which reference is now made. FIG. 5 is a graph of percentage power saving (PPS) versus channel SNR (in units of Eb/N0, where Eb is Energy per bit and N0 is Noise Power Spectral Density). A PPS value of 1 indicates no saving of power, and a PPS value of 0.1 indicates a 90% saving of power. FIG. 6 is a graph of the word error rate (WER) versus channel SNR. FIG. 7 is a graph of the false alarm rate versus channel SNR FIG. 8 is a graph of the probability of a lost message versus channel SNR. In each of the graphs, a receiver according to an embodiment of the present invention is shown as a solid line, whereas a receiver according to Croft is shown as a dashed line. It can be seen from the graphs that the receiver of an embodiment of the present invention performs better at all channel SNRs than a receiver according to Croft with more power savings, a lower WER, a lower rate of false alarms and a smaller probability of lost messages.

Figure 9:
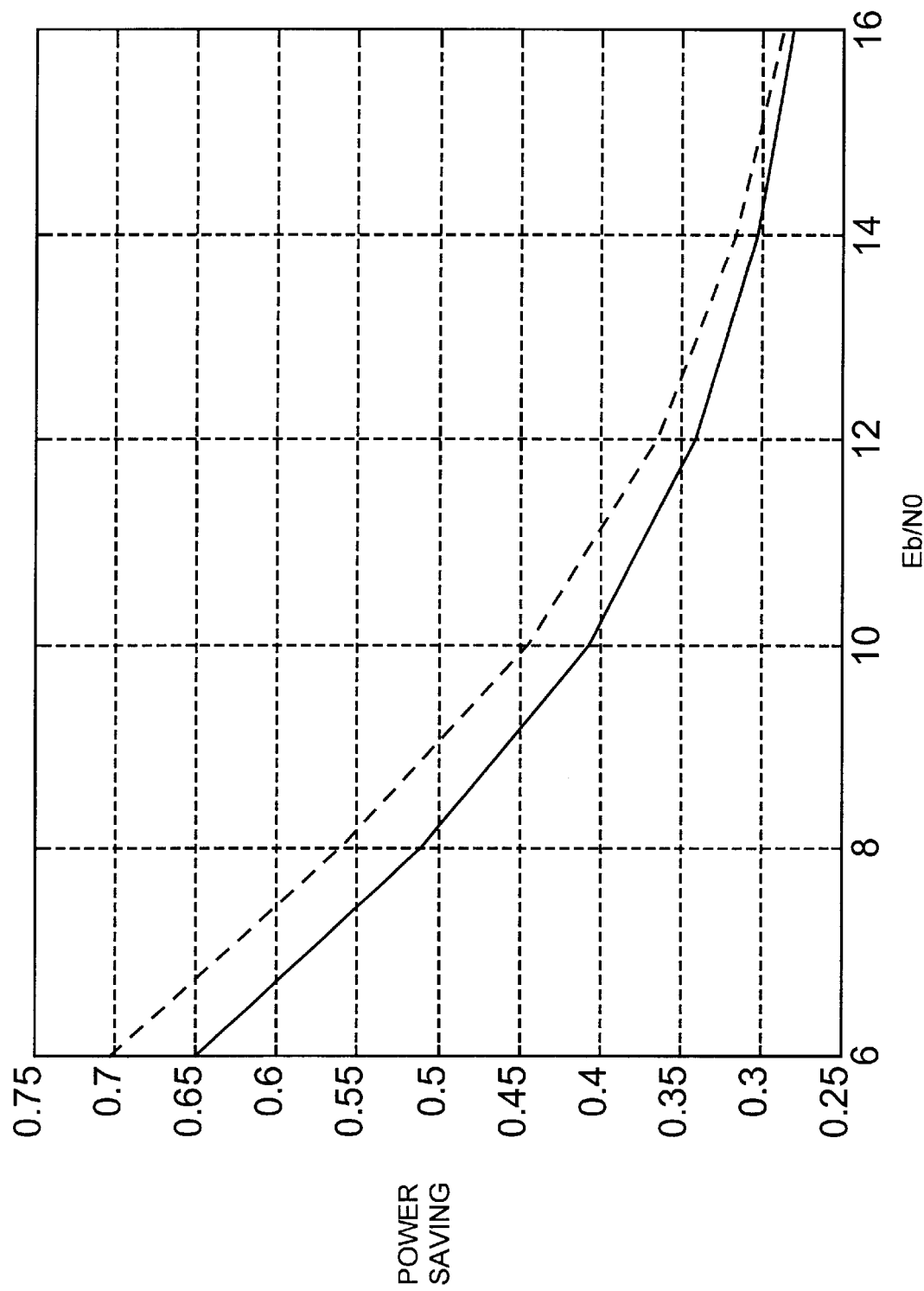
FIG. 9 is a graph comparing the power saving on a finding channel of a receiver of an embodiment of the present invention, and that of a receiver according to Croft.
Figure 10:
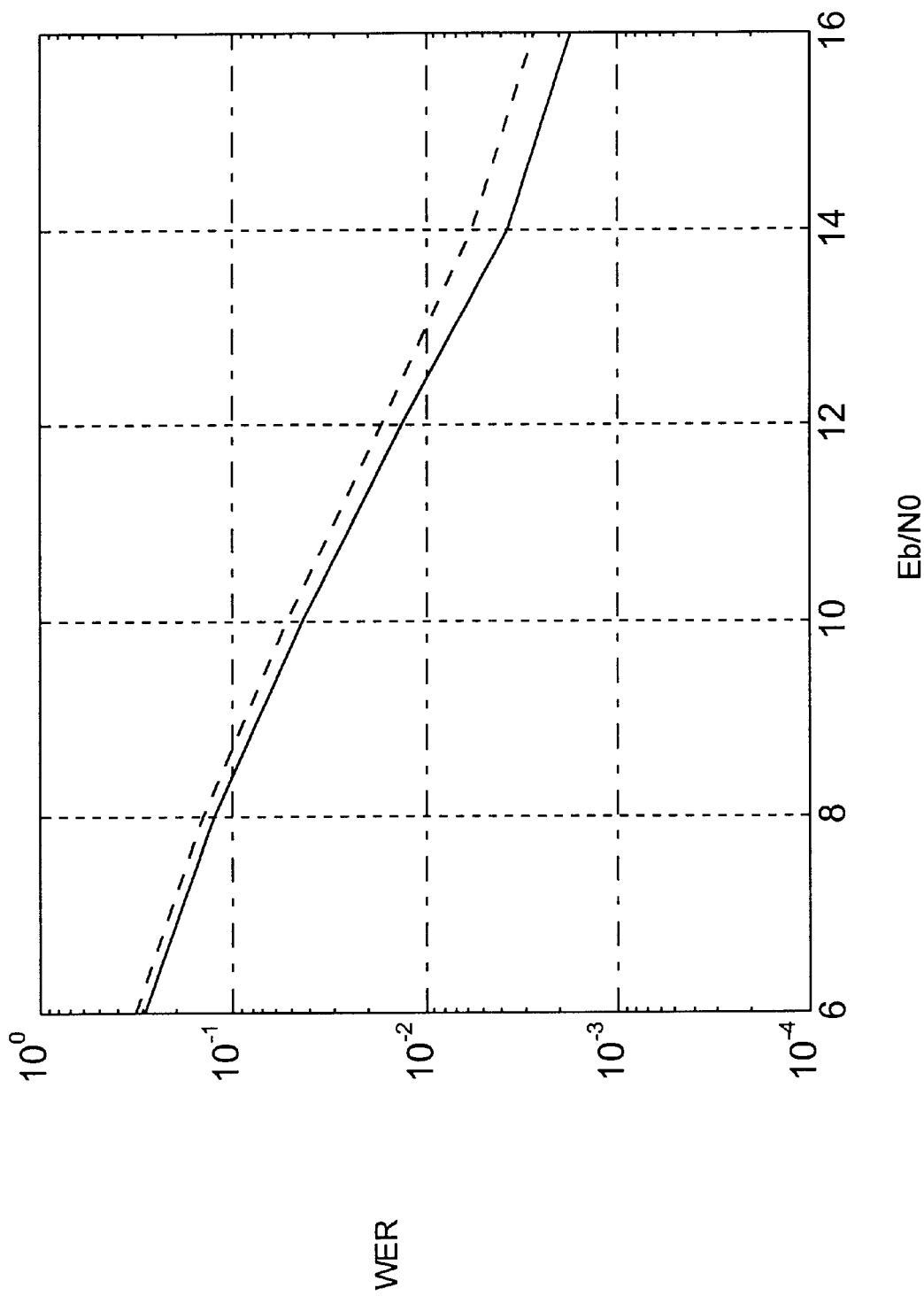
FIG. 10 is a graph comparing the word error rate (R) on a fading channel of a receiver of an embodiment of the present invention, and that of a receiver according to Croft.
Figure 11:
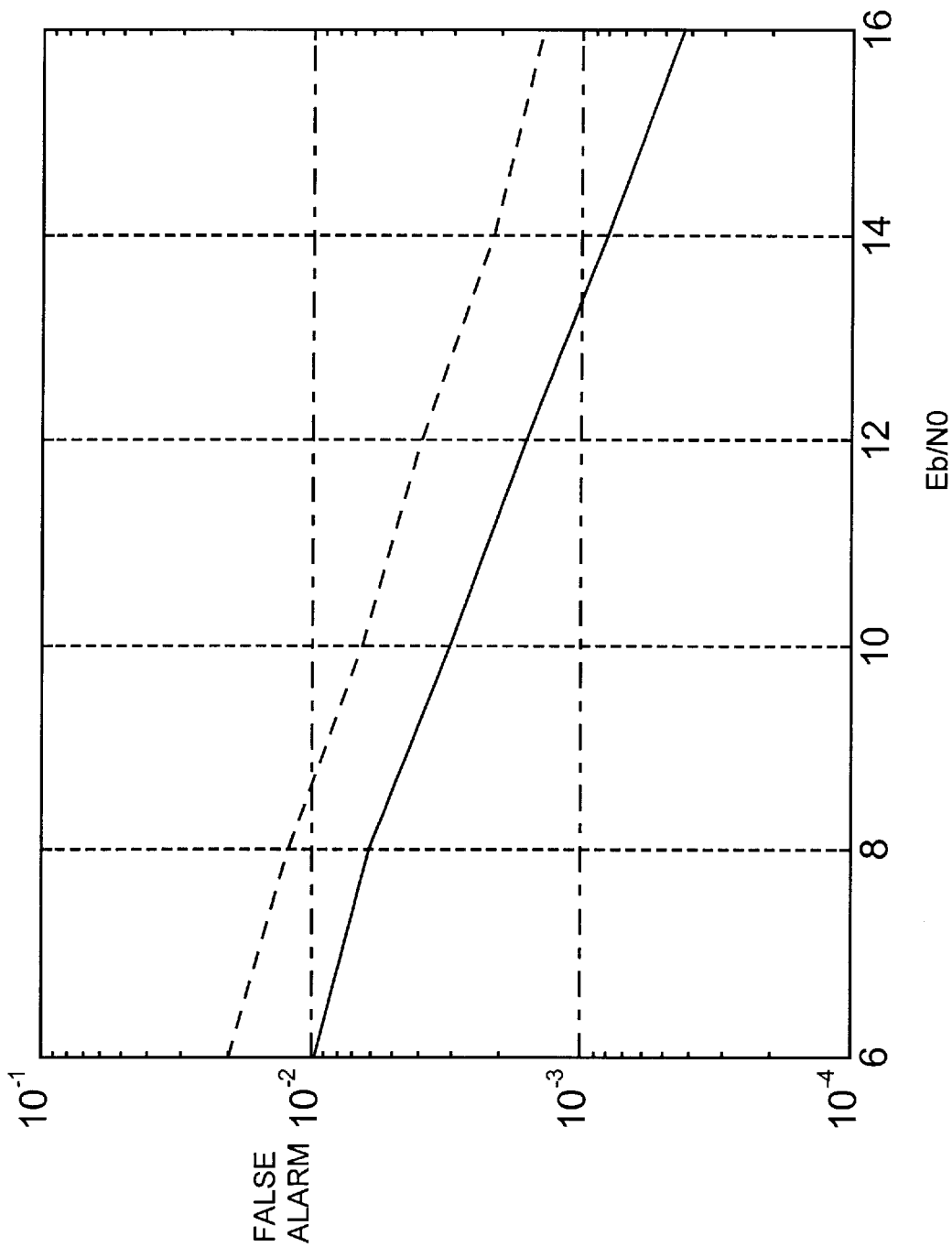
FIG. 11 is a graph comparing the false alarm rate on a fading channel of a receiver of an embodiment of tie present invention, and that of a receiver according to Croft.
Figure 12:
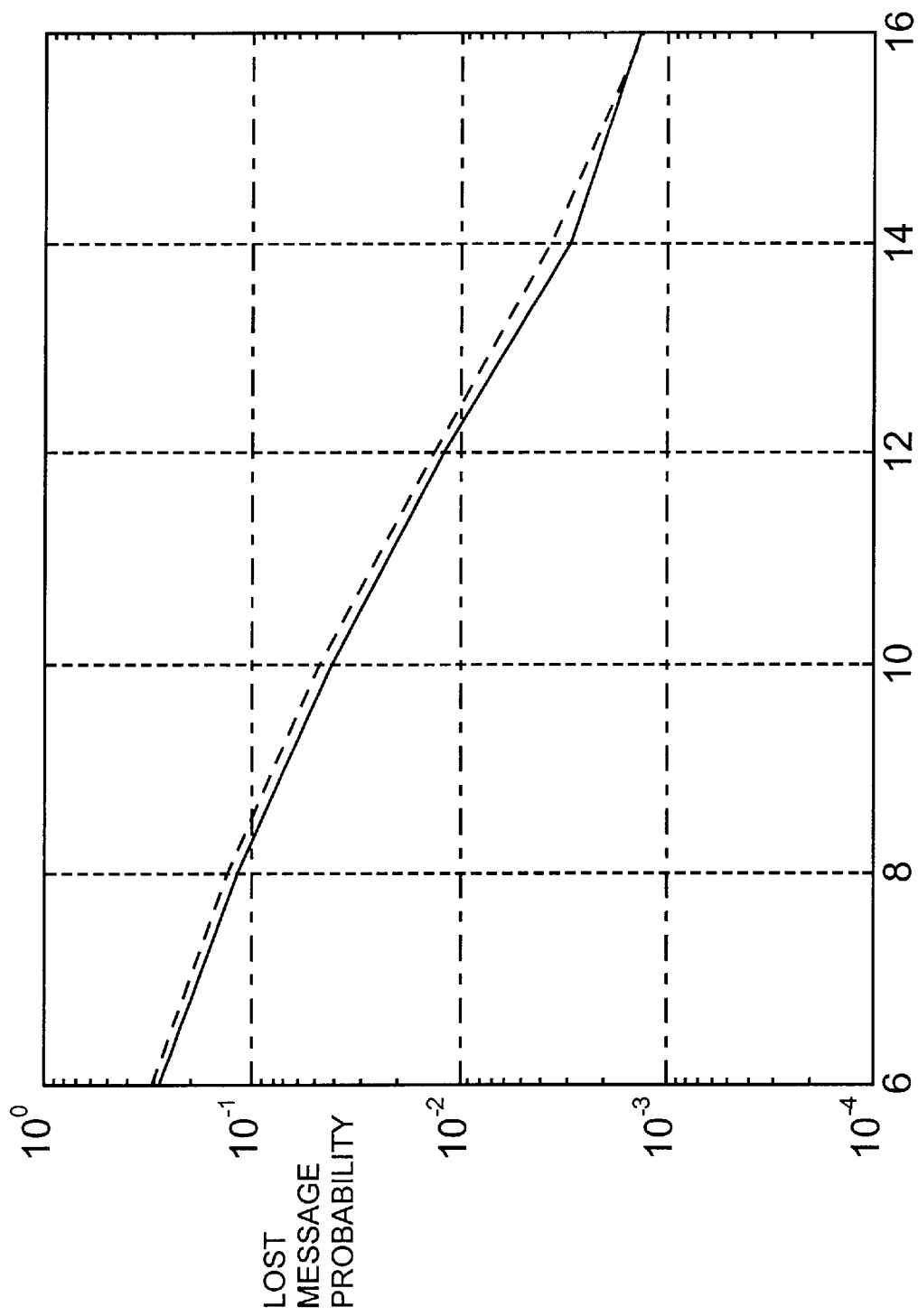
FIG. 12 is a graph comparing the probability of a lost message on a fading channel of a receiver of an embodiment of the present invention, and of a receiver according to Croft.

The results of the fading channel simulation, comparing a receiver according to an embodiment of the present invention to a receiver according to Croft, are shown in FIGS. 9, 10, 11 and 12, to which reference is now made. FIG. 9 is a graph of percentage power saving (PPS) versus channel SNR where a PPS value of 1 indicates no saving of power, and a PPS value of 0.1 indicates a 90% saving of power. FIG. 10 is a graph of the word error rate (WER) versus channel SNR. FIG. 11 is a graph of the false alarm rate versus channel SNR. FIG. 12 is a graph of the probability of a lost message versus channel SNR. In each of the graphs, a receiver according to an embodiment of the present invention is shown as a solid line, whereas a receiver according to Croft is shown as a dashed line. It can be seen from the graphs that the receiver of an embodiment of the present invention performs better at all channel SNRs than a receiver according to Croft, with more power savings, a lower WER, a lower rate of false alarms and a smaller probability of lost messages.

It will be appreciated by persons skilled in the art that the present invention is not limited by what has been particularly shown and described herein above. Rather the scope of the invention is defined by the claims that follow.

What claimed is:

1. A device for power management of a receiver which receives repetitions of a word containing a message possibly addressed to said receiver, the device comprising:
   a soft decoder for soft decoding at least one of said repetitions to produce a codeword; and
   a power reducer for reducing power to said receiver when said message contained in said codeword is not addressed to said receiver.

2. A device according to claim 1, wherein said soft decoder comprises:
   a candidate generator for generating candidates based upon at least one of said repetitions; and
   a selector for selecting a best candidate from said generated candidates as said codeword.

3. A device according to claim 2, wherein said selector comprises a correlation metric calculator for calculating a correlation metric, and said best candidate is the candidate which minimizes said correlation metric.

4. A device according to claim 2, wherein said candidate generator comprises:
   a locator for identifying the location of low confidence bits in said at least one repetition;
   a pattern template generator for generating pattern templates based upon said locations;
   a test pattern generator for generating test patterns based upon said at least one repetition and said pattern templates; and
   an algebraic decoder for decoding said test patterns as candidates.

5. A device according to claim 4, herein said locator includes means for using said soft decision variables for identification of said low confidence bits.

6. A device according to claim 4, wherein said locator includes means for using received signal strength indicator (RSSI) information for identification of said low confidence bits.

7. A device according to claim 1, the device further comprising:
   a determiner for determining the probable reliability of said codeword.

8. A device according to claim 7, wherein said determiner determines said probable reliability based upon output of said soft decoder.

9. A device according to claim 7, wherein said determiner comprises:
   an estimator for producing an average bit level estimate and a signal to noise ratio estimate for said at least one repetition;
   a calculator for calculating a probability associated with said codeword, based upon said estimates; and
   a decision block for deciding the reliability of said codeword based upon said probability.

10. A device according to claim 1, wherein said receiver is one of a group comprising a mobile telephone, a local loop, a pager and a cordless telephone.

11. A method for managing power in a receiver, the method comprising the steps of:
    receiving a repetition of a word containing a message possibly addressed to said receiver;
    combining said repetition with previous repetitions of said word;
    generating candidates from information contained in said combination;
    selecting a best candidate from said generated candidates;
    determining the probable reliability of said best candidate;
    if said best candidate is probably reliable and said message contained therein is not addressed to said receiver, reducing power to said receiver; and
    if said best candidate is probably not reliable, repeating all of said steps until either said best candidate is probably reliable or no further repetitions of said word are received.

12. A method according to claim 11, wherein said step of combining includes the steps of:
    multiplying bits of said repetitions by weight factors to produce products; and
    accumulating said products.

13. A method according to claim 12, wherein said weight factors are based upon RSSI information for identification of said low confidence bits.

14. A method according to claim 11, wherein said step of generating comprises the steps of:
    identifying the location of low confidence bits of said combination;
    generating pattern templates based upon said locations;
    generating test patterns based upon said combination and said pattern templates; and
    decoding said test patterns.

15. A method according to claim 14, wherein said receiver generates soft decision variables associated with bits of said received repetitions, and wherein said step of identifying uses said soft decision variables for identification of said low confidence bits.

16. A method according to claim 14, wherein said step of identifying uses RSSI information for identification of said low confidence bits.

17. A method according to claim 11, wherein said step of selecting comprises the steps of:
- calculating a correlation metric for each candidate; and
- choosing the candidate which minimizes said calculated correlation metric as best candidate.

18. A method according to claim 11, wherein said receiver generates soft decision variables associated with bits of said received repetitions, and wherein said probable reliability is based on said soft decision variables.

19. A method according to claim 11, wherein said probable reliability is based on the a posterior probability (APP) for said best candidate.

20. A method according claim 11, wherein said method further comprises the step of:
- restoring power to said receiver when a timer reaches a predetermined time, independent of at what time said step of reducing power occurred.

21. A method according to claim 11, wherein said receiver is one of a group comprising a mobile telephone, a local loop, a pager and a cordless telephone.

22. A mobile telephone comprising:
- a transmitter;
- a receiver which receives repetitions of a word containing a message possibly addressed to said mobile telephone;
- a soft decoder for soft decoding at least one of said repetitions to produce a codeword; and
- a power reducer for reducing power to said receiver when said message contained in said codeword is not addressed to said mobile telephone.

23. A mobile telephone according to claim 22, wherein said soft decoder comprises:
- a candidate generator for generating candidates based upon at least one of said repetitions; and
- a selector for selecting a best candidate from said generated candidates as said codeword.

24. A mobile telephone according to claim 23, wherein said selector comprises a correlation metric calculator for calculating a correlation metric, and said best candidate is the candidate which minimizes said correlation metric.

25. A mobile telephone according to claim 23, wherein said candidate generator comprises:
- a locator for identifying the location of low confidence bits in said at least one repetition;
- a pattern template generator for generating pattern templates based upon said locations;
- a test pattern generator for generating test patterns based upon said at least one repetition and said pattern templates; and
- an algebraic decoder for decoding said test patterns as candidates.

26. A mobile telephone according to claim 25, wherein said locator includes means for using said soft decision variables for identification of said low confidence bits.

27. A mobile telephone according to claim 25, wherein said locator includes means for using received signal strength indicator (RSSI) information for identification of said low confidence bits.

28. A mobile telephone according to claim 22, the mobile telephone further comprising:
- a determiner for determining the probable reliability of said codeword.

29. A mobile telephone according to claim 28, wherein said determiner determines said probable reliability based upon output of said soft decoder.

30. A mobile telephone according to claim 28, wherein said determiner comprises:
- an estimator for producing an average bit level estimate and a signal to noise ratio estimate for said at least one repetition;
- a calculator for calculating a probability associated with said codeword, based upon said estimates; and
- a decision block for deciding the reliability of said codeword based upon said probability.

* * * * *